US008688977B2

(12) United States Patent  
Zaverucha

(10) Patent No.: US 8,688,977 B2
(45) Date of Patent: Apr. 1, 2014

(54) VALIDATING A BATCH OF IMPLICIT CERTIFICATES

(75) Inventor: Gregory Marc Zaverucha, Mississauga (CA)

(73) Assignee: Certicom Corp., Mississauga, Ontario (CA)

( * ) Notice: Subject to any disclaimer, the term of this patent is extended or adjusted under 35 U.S.C. 154(b) by 0 days.

(21) Appl. No.: 13/448,490

(22) Filed: Apr. 17, 2012

(65) Prior Publication Data

US 2012/0284508 A1   Nov. 8, 2012

(30) Foreign Application Priority Data

May 6, 2011   (CA) .................. PCT/CA2011/050279

(51) Int. Cl.
*H04L 29/06* (2006.01)
(52) U.S. Cl.
USPC ......................................................... 713/156
(58) Field of Classification Search
None
See application file for complete search history.

(56) References Cited

U.S. PATENT DOCUMENTS

| | | | |
|---|---|---|---|
| 6,792,530 | B1 | 9/2004 | Qu et al. |
| 7,391,868 | B2 | 6/2008 | Qu et al. |
| 7,653,201 | B2 | 1/2010 | Qu et al. |
| 2003/0005317 | A1 | 1/2003 | Audebert et al. |
| 2004/0266449 | A1 | 12/2004 | Smetters et al. |
| 2005/0193219 | A1 | 9/2005 | Vanstone |
| 2006/0248334 | A1* | 11/2006 | Ramzan et al. ............... 713/156 |
| 2007/0064932 | A1 | 3/2007 | Struik et al. |
| 2009/0046852 | A1 | 2/2009 | Vanstone |
| 2009/0086968 | A1 | 4/2009 | Vanstone |
| 2010/0023771 | A1 | 1/2010 | Struik |
| 2010/0095360 | A1 | 4/2010 | Pavlovski et al. |
| 2011/0087883 | A1 | 4/2011 | Campagna et al. |

FOREIGN PATENT DOCUMENTS

| | | |
|---|---|---|
| WO | 2005043807 | 5/2005 |
| WO | 2008058388 | 5/2008 |
| WO | 2009090519 | 7/2009 |

OTHER PUBLICATIONS

Bellare, M. et al; "Fast Batch Verification for Modular Exponentiation and Digital Signatures"; Proceedings of EUROCRYPT'98, LNCS 1403; Jun. 1998; 27 pages.
"Bernstein, D.J.; ""Pippenger's Exponentiation Algorithm""; . Draft dated 2002. Accessed online on or about Apr. 15, 2011, <http://cr.yp.to/papers/pippenger.pdf> 21 pages.".

(Continued)

*Primary Examiner* — Brandon Hoffman
(74) *Attorney, Agent, or Firm* — Fish & Richardson P.C.

(57) ABSTRACT

Methods, systems, and computer programs for validating a batch of implicit certificates are described. Data for a batch of implicit certificates are received and validated. In some aspect, the data include key-pair-validation values that can be used to validate the public and private keys for each implicit certificate. For example, the key-pair-validation values can include a private key, a public key reconstruction value, a public key of the certificate authority, and a hash of the implicit certificate. The key-pair-validation values are either valid or invalid according to a key-pair-validation function. In some cases, modification values are obtained independent of the key-pair-validation values, and the modification values are combined with the key-pair-validation values in a batch-validation function. The batch-validation function is evaluated for the batch of implicit certificates. Evaluating the batch-validation function identifies whether the key-pair-validation data include key-pair-validation values that are invalid according to the key-pair-validation function.

32 Claims, 5 Drawing Sheets

(56) References Cited

OTHER PUBLICATIONS

Zaverucha, G. et al.; "Group Testing and Batch Verification"; May 27, 2009; 18 pages. Available online: <http://www.cacr.math.uwaterloo.ca/techreports/2009/cacr2009-20.pdf>.

Camenisch, J. et al.; "Batch Verification of Short Signatures"; Proceedings of EUROCRYPT'07, LNCS 4515; May 19, 2007; 18 pages.

Campagna, M., et al.; "A Cryptographic Suite for Embedded Systems (SuiteE)," Certicom Corp.; Oct. 18, 2010; 27 pages.

Hankerson, Darrel et al.; "Guide to Elliptic Curve Cryptography"; 2004; 332 pages.

Kim, et al. "Batch Verification and Finding Invalid Signatures in a Group Signature Scheme"; International Journal of Network Security; vol. 13, No. 2; Sep. 2011; pp. 61-70.

Menezes, Alfred et al.; Handbook of Applied Cryptography—Chapter 14; 1996; 45 pages.

Pintsov et al.; "Postal Revenue Collection in the Digital Age"; Proceedings of Financial Cryptography and Data Security (FC'00), LNCS 1962; 2001; pp. 105-120.

Standards for Efficient Cryptography; "SEC 1: Elliptic Curve Cryptography"; Version 2.0, Dated May 2009, Certicom Corp.; 144 pages.

Standards for Efficient Cryptography; "SEC 4:Elliptic Curve Qu-Vanstone Implicit Certificate Scheme (ECQV)"; Working Draft dated Jun. 9, 2006; Version 1.1r1; Copyright 2006 Certicom Corp.; 28 pages.

Standards for Efficient Cryptography; "SEC 4:Elliptic Curve Qu-Vanstone Implicit Certificate Scheme (ECQV)"; Working Draft dated Oct. 17, 2008; Version 0.91; Copyright 2008 Certicom Corp.; 22 pages.

Standards for Efficient Cryptography; "SEC 4:Elliptic Curve Qu-Vanstone Implicit Certificate Scheme (ECQV)"; Working Draft Dated Mar. 9, 2011; Version 0.97; Copyright 2010 Certicom Corp.; 32 pages.

International Search Report issued in International Application No. PCT/CA2011/050279 on Jan. 9, 2012; 10 pages.

Brown, D. et al.; Provably secure implicit certificate schemes. Proceedings of Financial Cryptography and Data Security (FC'01), LNCS 2339 (2002), 156-165.

\* cited by examiner

VALIDATING A BATCH OF IMPLICIT CERTIFICATES

CROSS-REFERENCE TO RELATED APPLICATIONS

This application claims the benefit of PCT Application Serial No. PCT/CA2011/050279, entitled "Validating a Batch of Implicit Certificates," filed on May 6, 2011, the entire contents of which is hereby incorporated by reference.

BACKGROUND

This specification relates to validating a batch of implicit certificates. Cryptography systems enable secure communication over public channels. For example, digital signature schemes can be implemented in a public key cryptography system where users verify the authenticity of other users' digital signatures based on certificates issued by a trusted third party. In some cryptography systems, the certificate authority can issue a batch of implicit certificates.

BRIEF DESCRIPTION OF THE DRAWINGS

Like reference numbers and designations in the various drawings indicate like elements.

DETAILED DESCRIPTION

Figure 1:
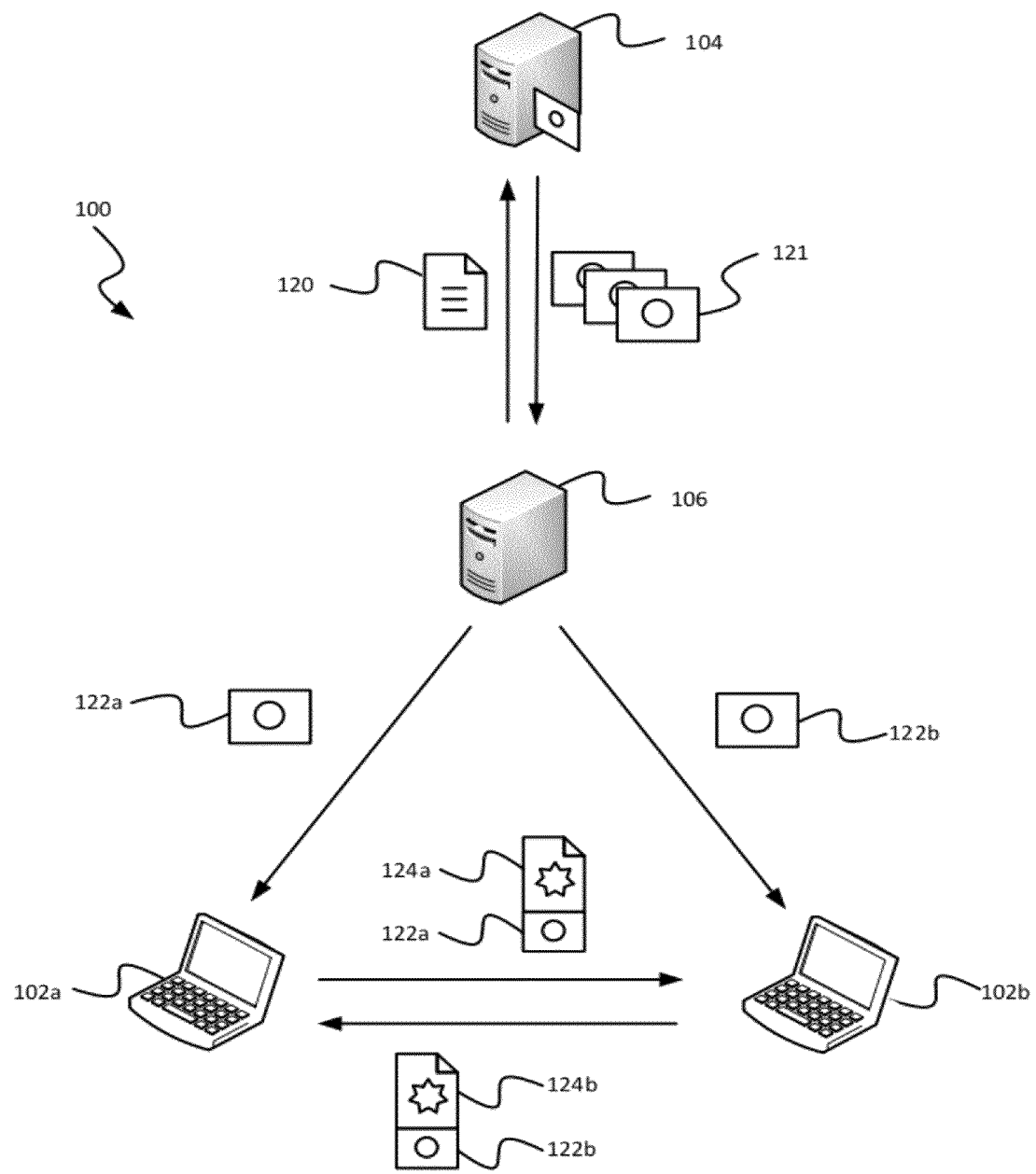
FIG. 1 is a schematic diagram showing aspects of an example cryptography system.

A batch of implicit certificates can be validated using batch-validation techniques. In some implementations, the batch-validation techniques can randomize or otherwise modify the data for each implicit certificate in a manner that improves the likelihood or the efficiency of detecting certain types of errors in the data. For example, some types of systematic or malicious errors in the batch data can cancel each other out when the batch data are combined according to particular batch-validation techniques. In some implementations, by modifying the data for each implicit certificate in the batch, correlations among errors in corrupted data sets can be removed or modified, and consequently the errors can be detected more efficiently. Moreover, the modification can be applied to the data in a manner that does not affect the validity or the invalidity of the individual implicit certificates in the batch. For example, the modification can be applied to public and private key values symmetrically with respect to a key-pair-validation function.

Batch-validation techniques can, in some cases, be implemented using fewer computational resources than would be required to individually validate each implicit certificate in the batch. For example, batch-validation techniques may be implemented more efficiently, requiring less computing time, less hardware, etc. Batch-validation techniques are useful in a variety of contexts. For example, in a manufacturing context, a manufacturer may receive a batch of implicit certificates from a certificate authority and inject the certificates into manufactured devices. The manufacturer can validate the batch of implicit certificates before injecting them into the devices, for example, to avoid producing devices that are inoperable due to invalid certificates. Moreover, in some implementations, reliable validation techniques can be important where the certificates are injected on devices that cannot be easily updated once they are deployed. For example, it may be difficult or impossible to replace an invalid certificate on a device having a write-once storage or a terminal lacking support for firmware updates.

Batch-validation techniques can be used to perform multiple types of validation operations for a batch of implicit certificates, including one or more validation operations required or recommended by a security standard or a communication protocol. For example, batch-validation techniques may be used to check the validity of the order of group elements, the validity of private and public key pairs, and the validity of other types of data for a batch of implicit certificates. The batch-validation techniques described herein can be utilized for any type of implicit certificate scheme. Specific examples are provided for Elliptic Curve Qu-Vanstone (ECQV) and optimal mail certificate (OMC) implicit certificate schemes, but the techniques described herein are not limited to those schemes.

The following notation is used in the present description for the examples of ECQV and OMC implicit certificate schemes. G represents a group of prime order n, written multiplicatively. The group elements can be generated by a generator g. The integer n representing the group order is $l_n$ bits long. A group element C represents a certificate authority's public key, an integer x represents the certificate authority's private key, and C and x are related by the equation $C=g^x$. (When the group is written additively, C and x are related by the equation $C=xg$.) A group element R represents a certificate request, an integer r represents a value chosen randomly by the requester, and R and r are related by the equation $R=g^r$. An integer k represents a value chosen randomly by the certificate authority during certificate generation.

A group element P represents a public key reconstruction value, which is included in the implicit certificate $Cert_U$. Attribute data U include attributes of the implicit certificate $Cert_U$. For example, the attribute data U may include information indicating an identification value for a user entity, an expiration date for the certificate, the identity of the certificate authority, etc. The implicit certificate $Cert_U$ may include the public key reconstruction value P, the attribute data U, or a combination of these and other data. For example, the implicit certificate $Cert_U$ may be constructed as $Cert_U=P\|U$ or another type of construction. A hash value e represents a hash of the implicit certificate $Cert_U$.

A group element B represents the public key corresponding to the public key reconstruction value P for the implicit certificate $Cert_U$. For example, in the OMC scheme, $B=C^eP$, and in the ECQV scheme, $B=CP^e$. An integer s represents the private key reconstruction value provided by the certificate authority. For example, in the OMC scheme, $s=k+xe$, and in the ECQV scheme, $s=x+ke$. An integer b represents the private key corresponding to the private key reconstruction value s for the implicit certificate $Cert_U$. In the OMC scheme, $B=g^b$ and $b=s+r$. In the ECQV scheme, $B=g^b$ and $b=s+er$.

A batch of l implicit certificates $Cert_U^i$ can be validated based on data elements $\mathcal{D}=\{(\mathcal{D}_i)\}_{i=1}^l$ for the batch. The data elements $\mathcal{D}$ for the batch include a data set $\mathcal{D}_i$ for each implicit certificate. In some implementations, the data set $\mathcal{D}_i$ for each implicit certificate $Cert_U^i$ includes the private key $b_i$ for the implicit certificate $Cert_U^i$, the public key reconstruction value $P_i$ for the implicit certificate $\text{Cert}_U^i$, the certificate authority public key value $C_i$ for the implicit certificate $\text{Cert}_U^i$, and the hash value $e_i$ for the implicit certificate $\text{Cert}_U^i$. Each data set $\mathcal{D}_i$ can include additional or different values. Generally, any property of the data elements for the batch can be validated. For example, the order of the group elements B, P, or R for the batch of implicit certificates can be validated. As another example, a relationship between the key pairs B,b for the batch of implicit certificates can be validated.

To obtain a batch of implicit certificates, a certificate request $R_i$ for each of the implicit certificates are generated and sent to a certificate authority. For example, in FIG. 1, the batch certificate server 106 generates l certificate requests $R_i$ and sends them to the certificate authority server 104. The individual certificate requests $R_i$ can be received in one or more certificate request message 120. Each certificate request $R_i$ can be sent to the certificate authority with an associated user identification values and other information. In some implementations, some or all of the certificate requests $R_i$ are generated in different locations or at different times, and the certificate requests $R_i$ can be sent separately or individually to the certificate authority.

The certificate authority can generate an implicit certificate for each of the certificate requests $R_i$. For example, the certificate authority may generate the implicit certificate by computing $\text{Cert}_U^i = P_i \| U_i$, where $P_i$ is the public key reconstruction value and $U_i$ is attribute data that includes the user identification. In some implementations, the certificate authority chooses an integer $k_i \in_R \mathbb{Z}_n$ for each of the certificate requests $R_i$ and computes the public key reconstruction value $P_i = R_i g^{k_i}$ based on the certificate request $R_i$ and the integer $k_i$. The certificate authority can utilize a cryptographic hash function to generate a hash value $e_i = H(\text{Cert}_U^i)$ based on each of the implicit certificates. The certificate authority can also generate a private key reconstruction value (e.g., $s_i = k_i + xe_i$ in the OMC implicit certificate scheme) for each of the certificate requests $R_i$, where x is the certificate authority's private key.

In response to the certificate requests $R_i$, the certificate authority can send the data for the batch of implicit certificates to the requester(s). For example, in FIG. 1, the certificate authority server 104 can send data for a batch 121 of implicit certificates to the batch certificate server 106. In some implementations, the private and public key pairs for the batch of implicit certificates can be derived based on a combination of the data that was previously used to generate the certificate requests and the data provided by the certificate authority. For example, in the OMC scheme the private key can be derived by computing $b_i = s_i + r_i$, and in the ECQV scheme the private key can be derived by computing $b_i = s_i + e_i r_i$. Moreover, in the OMC scheme the public key can be derived by computing $B_i = C_i^{e_i} P_i$, and in the ECQV scheme the public key can be derived by computing $B_i = C_i P_i^{e_i}$.

The batch of implicit certificates can be validated based on the data elements $\mathcal{D}$ for the batch. In some examples, $\mathcal{D} = \{(\mathcal{D}_i)\}_{i=1}^l = \{(C_i, P_i, b_i, e_i)\}_{i=1}^l$, and the data set $\mathcal{D}_i$ for each implicit certificate $\text{Cert}_U^i$ includes the certificate authority public key $C_i$, the public key reconstruction value $P_i$, the private key $b_i$, and the hash value $e_i$. Each data set can be individually validated using a key-pair-validation function. In the OMC scheme, the key-pair-validation function $$\text{ValidateOMC}(C_i, P_i, e_i, b_i) = \begin{cases} \text{accept}, & \text{if } g^{b_i} = C_i^{e_i} P_i \\ \text{reject}, & \text{otherwise} \end{cases} \quad (1)$$

can be applied to each data set $\mathcal{D}_i$. Similarly, in the ECQV scheme, the key-pair-validation function $$\text{ValidateECQV}(C_i, P_i, e_i, b_i) = \begin{cases} \text{accept}, & \text{if } g^{b_i} = C_i P_i^{e_i} \\ \text{reject}, & \text{otherwise} \end{cases} \quad (2)$$

can be applied to each data set $\mathcal{D}_i$. In some implementations, the key pairs for the batch of implicit certificates can be validated without evaluating the key-pair-validation function for any of the individual key pairs.

Equation 1 and Equation 2 above are examples of key-pair-validation functions that can be used to determine whether the key pair for an individual implicit certificate is valid. More generally, a key-pair-validation function may operate on any set of key-pair-validation values for an implicit certificate. For example, because $P_i$ and $e_i$ can each be derived from $\text{Cert}_U^i$, the key-pair-validation functions can be expressed in terms of input values including $(P_i, C_i, \text{Cert}_U^i, b_i)$ or another combination of values from which the key pair can validated. If $e_i = H(\text{Cert}_U^i)$ is computed by a first entity (e.g., the certificate authority) and another entity (e.g., a user entity) evaluates the key-pair-validation function, the entity that evaluates the key-pair-validation function has to trust that the first entity computed $e_i$ correctly in order to have assurance that the key pair is valid with respect to the certificate $\text{Cert}_U^i$. In some implementations, the certificate authority is trusted to generate correct certificates, and so errors in the data elements for the batch of certificates are accidental. Accidental errors include errors caused by a software error and other types of accidental errors.

When the certificate authority provides a batch of certificates to a requester, a batch-validation algorithm can be used to determine whether the certificates are valid. In some implementations, the batch-validation function can be evaluated considerably faster than evaluating the key-pair-validation function for each individual certificate in the batch. A batch-validation function $\text{BatchValidate}(\mathcal{D})$ can have the following property:

$$\text{BatchValidate}(\mathcal{D}) = \text{accept if and only if,} \ldots$$
$$\text{Validate}(\mathcal{D}) = \text{accept for all } i. \quad (3)$$

where Validate $(\mathcal{D}_i)$ is an appropriate key-pair-validation function (e.g., Equation 1 or Equation 2 above). In some cases, the batch-validation function is evaluated based on the data sets $\mathcal{D}_i$ without modifying the values in the data sets $\mathcal{D}_i$.

In some implementations, one or more values of each data set $\mathcal{D}_i$ can be modified for batch validation. The modification can, in some instances, improve the likelihood that the batch-validation function will detect certain types of errors. For example, relationships among some types of errors in a batch of implicit certificates can cause the errors to cancel each other out when the data sets are combined in a particular batch-validation algorithms, which may allow the errors to go undetected in some cases. Applying modification values $d_i$ to each data set $\mathcal{D}_i$ can randomize or otherwise remove the relationships among the errors and thereby allow the errors to be detected by a batch-validation function. The modification value $d_i$ can be selected for each data set $\mathcal{D}_i$ and applied to one or more of the values in the data set $\mathcal{D}_i$ in a manner that preserves the validity or the invalidity of the individual data set $\mathcal{D}_i$ according to the key-pair-validation function (e.g., Equation 1 or Equation 2 above). In other words, the modification value $d_i$ can be selected randomly and applied to the key-pair-validation values according to the key-pair-validation function.

As an example, the modification value $d_i$ can be applied to the data set $\mathcal{D}_i=(C_i, P_i, b_i, e_i)$ for an OMC implicit certificate as $g^{b_i d_i} = C_i^{e_i d_i} P_i^{d_i}$, such that the result of the key-pair-validation function ValidateOMC is unchanged. As another example, the modification value $d_i$ can be applied to the data set $\mathcal{D}_i=(C_i, P_i, b_i, e_i)$ for an ECQV implicit certificate as $g^{b_i d_i} = C_i^{d_i} P_i^{e_i d_i}$, such that the result of the key-pair-validation function ValidateECQV is unchanged. In addition to these examples, the modification values $d_i$ can be applied to each data set $\mathcal{D}_i$ in other ways that preserve the validity or the invalidity of the data set according to the key-pair-validation function or another type of function. For example, the modification value $d_i$ can be applied to each data set $\mathcal{D}_i$ based on adding the modification values $d_i$ to both sides of the key-pair-validation function, based on multiplying both sides of the key-pair-validation function by the modification values $d_i$, or based on a combination of these and other operations.

In some implementations, combining the modified key-pair-validation values in the batch-validation function can improve the likelihood of detecting arbitrary faults (including, e.g., malicious errors, random errors, accidental errors, etc.) in data elements $\mathcal{D}$ for the batch. Using the modification values in the batch-validation process can modify or eliminate the relationships between the data sets $\mathcal{D}_i$ and thereby decrease the likelihood that the batch-validation process approves invalid certificates in some cases. For example, randomizing the relationships between the data sets $\mathcal{D}_i$ may allow the batch-validation to detect errors that would otherwise cancel each other out when combined in a batch-validation expression.

An example of a batch-validation function that modifies the relationships between the data sets $\mathcal{D}_i=(C_i, P_i, b_i, e_i)$ is provided for the examples of OMC and ECQV as follows. The batch-validation function can be represented as $$BatchValidate(D) = \begin{cases} \text{accept,} & \text{if } X = \text{true} \\ \text{reject,} & \text{otherwise.} \end{cases} \quad (4)$$

In the OMC implicit certificate scheme, X=true in Equation 4 if $$g^{\sum_{i=1}^{l} d_i b_i} = \prod_{c_j \in \mathcal{C}} C_j^{\sum_{C_i = C_j}^{l} e_i d_i} \prod_{i=1}^{l} P_i^{d_i}. \quad (5)$$

In the ECQV implicit certificate scheme, X=true if in Equation 4 if $$g^{\sum_{i=1}^{l} b_i d_i} = \prod_{c_j \in \mathcal{C}} C_j^{\sum_{C_i = C_j}^{l} d_i} \prod_{i=1}^{l} P_i^{e_i d_i}. \quad (6)$$

In Equations 5 and 6 above, $\mathcal{C} = \cup_{i=1}^{l} \{C_i\}$ is the set of distinct certificate authority public key values, and all arithmetic is performed modulo n. The batch-validation technique represented by Equations 4, 5, and 6 above can be modified for a batch that contains both ECQV and OMC implicit certificates and for other types of implicit certificates.

The modification values $d_i$ in Equations 5 and 6 can be selected based on a selection parameter $\kappa$. For example, the selection parameter $\kappa$ can be chosen such that $\kappa < l_n$. As noted above, G represents a group of prime order n generated by the generator g, and the integer n is $l_n$ bits long. In some implementations, the values $d_i$ are obtained by selecting $d_i \in_R \{0,1\}^{\kappa}$ for $i=1, \ldots, l$. The modification values $d_i$ can be converted to an appropriate data type or range, for example, by converting the modification values $d_i$ to an integer modulo n. In some implementations, one or all of the modification values $d_i$ are randomly selected. For example, each of the modification values $d_i$ can be an independently-selected random value. In some implementations, one or more of the modification values $d_i$ is a non-random value. For example, one or more of the modification values $d_i$ can be pre-selected so that the key-pair-validation values are not modified when the modification values $d_i$ are applied to the data sets $\mathcal{D}_i$. As a particular example, in some cases, all of the values $d_i$ in Equations (5) and (6) can be set to 1. Other types of non-random values may be used.

In some implementations, the values of each data set $\mathcal{D}_i$ can be modified for the limited purpose of validating the data set $\mathcal{D}_i$. For example, if the batch is approved for use in the cryptography system the initial (i.e., unmodified) data sets $\mathcal{D}_i$ can be distributed for use. In some cases, the modified data sets are deleted after the batch-validation process has completed. The modified data sets may also be used for other purposes other than validating the data set $\mathcal{D}_i$.

The output of the batch-validation function BatchValidate($\mathcal{D}$) in Equation 4 is either "accept" or "reject," based on the result of evaluating Equation 5, Equation 6, or a similar equation. When the data elements $\mathcal{D}$ for the batch include one or more data sets $\mathcal{D}_i$ that are invalid according to the key-pair-validation function (e.g., Equation 1 or Equation 2 above), the output of the batch-validation function BatchValidate($\mathcal{D}$) in equation 4 is "reject." As discussed below, in some cases there is a finite probability (e.g. $2^{-\kappa}$) that a batch including an invalid data set will be accepted by the batch-validation function. When the data elements $\mathcal{D}$ do not include any data sets $\mathcal{D}_i$ that are invalid according to the key-pair-validation function (e.g., Equation 1 or Equation 2 above), the output of the batch-validation function BatchValidate($\mathcal{D}$) in Equation 4 is "accept." In some implementations, evaluating Equation 5 or Equation 6 on the data elements $\mathcal{D}$ for the batch requires fewer computational resources than evaluating Equation 1 or Equation 2 on all of the individual data sets $\mathcal{D}_i$ for the batch.

The following discussion demonstrates that evaluating the batch-validation function BatchValidate($\mathcal{D}$) in Equation 4 based on Equation 5 for the OMC scheme accepts valid batches. When Equation 5 is written to the base g it becomes $$g^{b_1 d_1 + \ldots + b_l d_l} = g^{d_1(x_1 e_1 + \rho_1) + \ldots + d_l(x_l e_l + \rho_l)} \quad (7)$$

where $\rho_i = \log_g P_i$, and $x_i = \log_g C_i$. For equality in Equation 7, the exponents must be equal, or equivalently, their difference must be zero. Accordingly, $$d_1(b_1 - x_1 e_1 - \rho_1) + \ldots + d_l(b_l - x_l e_l - \rho_l) \equiv 0 \pmod{n}. \quad (8)$$

If the batch is valid, then $b_i = x_i e_i + \rho_i$ for all i, and the differences are zero. Thus, evaluating the batch-validation function BatchValidate($\mathcal{D}$) in Equation 4 based on Equation 5 accepts valid batches. The discussion above can be adapted to show for the ECQV scheme that the batch-validation function BatchValidate($\mathcal{D}$) in Equation 4 based on Equation 6 also accepts valid batches.

In some implementations, there is a finite probability that evaluating the batch-validation function BatchValidate($\mathcal{D}$) in Equation 4 above accepts a batch that includes an invalid implicit certificate. For example, when the batch includes an implicit certificate having an invalid key pair, evaluating the batch-validation function BatchValidate($\mathcal{D}$) in Equation 4 based on Equation 5 or Equation 6 accepts the invalid batch with a probability of $2^{-\kappa}$.

The following discussion demonstrates that an invalid batch will be accepted with a probability of $2^{-\kappa}$ when the batch-validation function BatchValidate($\mathcal{D}$) in Equation 4 above is used to evaluate the batch based on Equation 5 for the OMC scheme. When the batch is invalid, there is one or more index i such that $b_i - x_i e_i - \rho_i \neq 0$. Without loss of generality, if $b_1 - x_1 e_1 - \rho_1 \neq 0$, the batch is incorrectly accepted if $$b_1 d_1 + \ldots + b_l d_l = d_1(x_1 e_1 + \rho_1) + \ldots + d_l(x_l e_l - \rho_l) \pmod{n} \quad (9)$$

which can be rearranged as $$d_1 = (b_1 - x_1 e_1 - \rho_1)^{-1} \times (d_2(x_2 e_2 + \rho_2 - b_2) + \ldots + (+d_l(x_l e_l + \rho_l - b_l)) \pmod{n} \quad (10)$$

For fixed values of the modification values $d_2, \ldots, d_l$, there is only one choice of $d_1$ that satisfies Equation 10 and $d_1$ is drawn uniformly at random from a set of size $2^\kappa$ and $\kappa \triangleleft_n$. Therefore, an invalid batch is incorrectly accepted with probability $2^{-\kappa}$. The same holds when modification values $d_1, \ldots, d_l$ are chosen independently at random. Thus, an invalid batch will be accepted with a probability of $2^{-\kappa}$ when the batch-validation function BatchValidate($\mathcal{D}$) in Equation 4 above is evaluated based on Equation 5 for the OMC scheme. The discussion above can be adapted to show, for the ECQV, scheme that an invalid batch will also be accepted probability of $2^{-\kappa}$ when the batch is validated by the batch-validation function BatchValidate($\mathcal{D}$) in Equation 4 based on Equation 6. For example, for the ECQV scheme, the same argument holds, but the terms in the exponent on the right hand side of Equation 7 have the form $d_i(x_i + e_i \rho_i)$.

In some instances, the batch-validation technique represented by Equations 4, 5, and 6 rejects an invalid batch based on the presence of one or more invalid data sets $\mathcal{D}_i$ that would not be detected by other types of batch-validation techniques. For example, if a malicious party corrupted the private key $b_j$ of a particular valid data set $\mathcal{D}_j$ by adding a value $\delta$ to the private key $b_j$ and corrupted the private key $b_k$ of another particular valid data set $\mathcal{D}_k$ by subtracting the same value $\delta$ from the private key $b_k$, the corrupted data sets having the modified private keys $\mathcal{D}'_j$ and $\mathcal{D}'_k$ would be invalid according to the appropriate key-validation function (e.g., Equation 1 or Equation 2). However, if the private keys $(b_k + \delta)$ and $(b_j - \delta)$ were combined in a batch-validation function without applying modification values $d_k$ and $d_j$ to the private keys, the corrupted values would cancel each other out, and the batch-validation function would approve the corrupted data sets $\mathcal{D}'_j$ and $\mathcal{D}'_k$. By contrast, the batch-validation techniques represented by Equations 4, 5, and 6 would apply different modification values $d_k$ and $d_j$ to the corrupted private keys, and the resulting corrupted private keys $d_k(b_k + \delta)$ and $d_j(b_j - \delta)$ as modified by the modification values $d_k$ and $d_j$ would not cancel each other out when they are combined in a batch-validation function. Thus, the batch-validation technique represented by Equations 4, 5, and 6 would reject the batch containing the corrupted data sets $\mathcal{D}'_j$ and $\mathcal{D}'_k$, whereas some other batch-validation techniques would improperly accept the batch.

Other types of errors can also be detected by the batch-validation technique. When errors in the batch are introduced uniformly at random, some or all of the values $(P_i, b_i, e_i)$ are replaced with values drawn independently from the uniform distribution on $\mathbb{Z}_n$, and G. In some implementations, the errors are introduced according to some unknown and not necessarily uniform distribution. For example, a software bug could cause every eighth implicit certificate to have $b_i$ incorrectly set to the value 1337, and the batch-validation technique represented by Equations 4, 5, and 6 above could detect the presence of the invalid data sets.

Validating the data elements $\mathcal{D}$ for a batch of implicit certificates can include validating the order of group elements included in the data sets $\mathcal{D}_i = (C_i, P_i, b_i, e_i)$, or group elements that can be derived from the data sets $\mathcal{D}_i$. For example, if the data set $\mathcal{D}_i$ is valid, the certificate authority public key $C_i$, the public key reconstruction value $P_i$, and the public key $B_i$ will all be valid elements of the group G and have prime order n. Validating that one or more of the group elements has order n may be required or recommended by a standard or a communication protocol to ensure that issued implicit certificates are valid, to ensure a specified level of security, or for any combination of these and other reasons. For example, some aspects of the SECG standard entitled "SEC1: Elliptic Curve Cryptography, Version 2.0" include checking the order of group elements. The order of a group element Q can be individually validated by checking that $Q^n = 1$ and $Q \neq 1$. Here, the order of the group G is n, and G is a subgroup of G', where G' is a larger group with order nh. Validating that an element has order n ensures that it belongs to G, and not another subgroup of G'. In some implementations, the value h is a small value greater than 1. In some implementations, the value h is a large value.

The order of the group elements can be validated collectively for a batch of implicit certificates. For example, the public keys $B_i$ for a batch of implicit certificates can be collectively validated to determine whether any of the public keys $B_i$ has an order that is different from the order n specified by the cryptographic parameters. A modification value $d_i$ can be selected for each group element $Q_i$ and applied the group elements group elements $Q_i$. For example, given a set of elements $Q_1, \ldots, Q_l$ in G', small exponents $d_1, \ldots, d_l$ can be obtained, and if $$(\Pi_{i=1}^l Q_i^{d_i})^n = 1, \quad (11)$$

then the set of elements $Q_1, \ldots, Q_l$ can be approved. Accordingly, an element-order-validation function for a set of elements $Q = \{(Q_1, \ldots, Q_l\}$ can be represented as $$OrderValidate(Q) = \begin{cases} \text{accept,} & \text{if } Y = \text{true} \\ \text{reject,} & \text{otherwise} \end{cases}, \quad (12)$$

where Y=true in Equation 12 if $$n(d_1 y_1 + \ldots + d_l y_l) \equiv 0 \pmod{nh}, \quad (13)$$

which holds if Equation (11) holds. In Equation 13, $y_i = \log_g Q_i$, where g is a generator of the group G. The modification values $d_i$ in Equation 13 can be obtained, for example, by randomly selecting $d_i \in_R [0, 2^\kappa - 1]$ for $i = 1, \ldots, l$.

The output of the element-order-validation function in Equation 12 is either "accept" or "reject," based on the result of evaluating Equation 13. When the set of elements $Q = \{Q_1, \ldots, Q_l\}$ each has the order n specified by the cryptographic parameters, the output of the element-order-validation function OrderValidate(Q) is "accept." When the set of elements $Q = \{Q_1, \ldots, Q_l\}$ includes an element having an order that is different from the order n specified by the cryptographic parameters, the output of the element-order-validation function OrderValidate(Q) is "reject." In some implementations, the collective element-order-validation function of Equations 12 and 13 accepts a set of elements $Q = \{Q_1, \ldots, Q_l\}$ that includes an invalid group element with a probability $2^{-\kappa}$. In some implementations, evaluating the collective element-order-validation function of Equations 12 and 13 requires fewer computational resources than validating the order of each element $Q_i$ individually. For example, the efficiency gains may be significant when G is a subgroup (having prime order n) of a larger group of order nh, where both n and h are large.

An element order validation technique that operates collectively on multiple group elements, such as the technique represented by Equations 12 and 13 and similar techniques, may be used to validate the order of any type of group element for a batch of implicit certificates. For example, an element order validation technique that operates collectively on multiple group elements can be used to validate the order of public keys $B_i$, public key reconstruction values $P_i$, certificate requests $R_i$, or any combination of these and other types of group elements for implicit certificates in a batch of implicit certificates. In some cases, an element order validation technique that operates collectively on multiple group elements is applied to multiple group elements in a data set pertaining to a single implicit certificate.

Table 1 summarizes efficiency that may be achieved in some implementations of the described techniques. Columns in Table 1 correspond to three different types of operations that are counted: exponentiation in G (i.e., computing $g^x$ where x is $l_n$ bits), small exponentiation in G (i.e., computing $g^x$ where x is $\kappa$ bits) and multiplication in G.

TABLE 1

| Technique | G exp. | G small-exp. | G mult. |
|---|---|---|---|
| Validate individually (OMC or ECQV) | 2l | — | l |
| Batch Validate (OMC) | z + 1 | l | l + z |
| Batch Validate (ECQV) | l + 1 | z | l + z |

The rows in Table 1 correspond to different validation techniques. In particular, Table 1 shows the number of computations executed for evaluating the key-pair-validation function (e.g., evaluating Equation 1 or Equation 2) for each implicit certificate in a batch of size l; the number of computations executed for evaluating a batch-validation function for a batch of l ECQV implicit certificates (e.g., evaluating Equation 4 based on Equation 6); and the number of computations executed for evaluating a batch-validation function for a batch of l OCM implicit certificates (e.g., evaluating Equation 4 based on Equation 5). The number of distinct certificate authority public keys in the batch is denoted by the value z.

As shown in Table 1, in some cases, evaluating a batch-validation function in the OMC scheme (e.g., evaluating Equation 4 based on Equation 5) for a batch of l certificates saves approximately 2l exponentiation operations when compared evaluating a key-pair-validation function (e.g., Equation 1 or Equation 2) for each implicit certificate in the batch. Similarly, evaluating a batch-validation function for the ECQV scheme (e.g., evaluating Equation 4 based on Equation 6) for a batch of l implicit certificates saves approximately l exponentiations when compared to evaluating a key-pair-validation function (e.g., Equation 2) for each implicit certificate in the batch. As such, in some cases, the savings in computational resources increases linearly or approximately linear with the size of the batch. The savings in computational resources may vary based on the size of the batch in a different manner. The batch-validation function may be evaluated for a batch of size one (e.g., l=1). In some instances, evaluating the batch-validation function in Equations 4, 5, and 6 for a single implicit certificate requires more computations than evaluating the key-pair validation function for the single implicit certificate.

For a more precise estimate, three operations are counted in Table 1. In some implementations, the impact of fast exponentiation techniques, also referred to as "multi-exponentiation," may reduce computation for the techniques considered here. In some implementations, the batch of implicit certificates can be divided in to groups or "buckets." The batch-validation function can be applied to the implicit certificates in each bucket separately. This approach may be useful and may improve efficiency in some cases, for example, for large batches of implicit certificates or in other cases.

FIG. 1 is a schematic diagram of an example cryptography system 100. The cryptography system 100 includes terminals 102a, 102b (collectively "terminals 102"), a certificate authority server 104, and a batch certificate server 106. The cryptography system 100 can include additional, fewer, or different components. For example, the cryptography system 100 may include additional storage devices, additional servers, additional terminals, and other features not shown in the figure.

The terminals 102 can communicate with each other and with the batch certificate server 106, and the batch certificate server 106 can communicate with the certificate authority server 104. In some implementations, some or all of the components of the cryptography system 100 communicate with each other over one or more data networks or other types of communication links. For example, the terminals 102 may communicate with each other over a public data network, and the batch certificate server 106 may communicate with the certificate authority server 104 over the same public data network or a different data network. In some implementations, the batch certificate server 106 communicates with the terminals 102 over a private network or another type of secure communication link.

The communication links utilized by cryptography system 100 can include any type of data communication network or other types of communication links. For example, the cryptography system 100 can utilize wired communication links, wireless communication links, and combinations thereof. As another example, the cryptography system 100 can utilize a wireless or wired network, a cellular network, a telecommunications network, an enterprise network, an application-specific public network, a Local Area Network (LAN), a Wide Area Network (WAN), a private network, a public network (such as the Internet), a WiFi network, a network that includes a satellite link, or another type of data communication network. In some instances, the cryptography system 100 can utilize a tiered network structure defined by firewalls or similar features that implement various levels of security.

In the example shown in FIG. 1, the batch certificate server 106 can send one or more certificate request messages 120 to the certificate authority server 104, and the certificate authority server 104 can respond by sending a batch 121 of implicit certificates to the batch certificate server 106. The batch 121 of implicit certificates includes the implicit certificates 122a, 122b and possibly additional implicit certificates. The batch certificate server 106 can send to the terminals 102 cryptographic data that allow the terminals 102 to communicate securely. For example, the batch certificate server 106 can send an implicit certificate 122a and a private key to the terminal 102a, and the batch certificate server 106 can send an implicit certificate 122b and a private key to the terminal 102b. In some implementations, multiple different certificate authorities contribute certificates to a single batch, and accordingly each certificate authority can send a different part of the batch to the batch certificate server 106. As a particular example, three different certificate authorities could each contribute ten implicit certificates to create a batch of thirty implicit certificates. Accordingly, the batch certificate server 106 can obtain the batch of implicit certificates by receiving multiple different sub-batches from one or more sources.

The terminal 102a can sign a message using its private key and send the signed message 124a with the implicit certificate 122a to the terminal 102b. The terminal 102b can verify the authenticity of the signed message 124a using the implicit certificate 122a. Similarly, the terminal 102b can sign a message using its private key and send the signed message 124b with the implicit certificate 122b to the terminal 102a. The terminal 102a can verify the authenticity of the signed message 124b using the implicit certificate 122b. The cryptography system 100 can support additional or different types of communication. For example, in some implementations, the terminals 102 exchange encrypted messages and other types of information with each other and with other components of the cryptography system 100.

The components of the cryptography system 100 can be implemented by any suitable computing systems or sub-systems. For example, the certificate authority server 104 and the batch certificate server 106, can each be implemented using any type of server system or other computing systems. A computing system generally includes a data processing apparatus, a data storage medium, a data interface, and possibly other components. The data storage medium can include, for example, a random access memory (RAM), a storage device (e.g., a writable read-only memory (ROM), etc.), a hard disk, or another type of storage medium. A computing system can be preprogrammed or it can be programmed (and reprogrammed) by loading a program from another source (e.g., from a CD-ROM, from another computer device through a data network, or in another manner). A computing system may include an input/output controller coupled to input/output devices (e.g., a monitor, a keyboard, etc.) and to a communication link. In some implementations, the input/output devices can receive and transmit data in analog or digital form over communication links such as a serial link, wireless link (e.g., infrared, radio frequency, etc.), parallel link, or another type of link.

The data storage medium of a computing system can store instructions (e.g., computer code) associated with computer applications, programs and computer program modules, and other resources. For example, the data storage of the batch certificate server 106 can store instructions associated with the computer program modules of the batch certificate module 206 shown in FIG. 2. The data storage medium of a computing system can store application data and data objects that can be interpreted by applications, programs, modules, or virtual machines running on the server system. The data processing apparatus of a server system can execute instructions to generate output data based on data inputs. For example, the data processing apparatus may include a general purpose processor that can run applications and programs by executing or interpreting the software, scripts, functions, executables, and other types of computer program code.

The certificate authority server 104 is a server system that can perform operations of a certificate authority in a cryptography system. The certificate authority server 104 is generally operable to receive, transmit, process, and store information associated with the cryptography system. Although FIG. 1 shows a single certificate authority server 104, a certificate authority can be implemented using multiple certificate authority servers 104, including server clusters, as well as additional or different types of computing devices other than servers. Moreover, multiple certificate authorities can be utilized. As such, the cryptography system 100 can include multiple certificate authority servers 104 that all belong to one logical entity, or the cryptography system 100 can include multiple certificate authority servers 104 that belong to multiple logical entities.

The batch certificate server 106 is a server system that can process a batch of implicit certificates. The batch certificate server 106 is generally operable to receive, transmit, process, and store information associated with the cryptography system. Although FIG. 1 shows a single batch certificate server 106, a batch of implicit certificates can be processed using multiple batch certificate server 106, including server clusters, as well as additional or different types of computing devices other than servers.

The terminals 102 are computing devices that can communicate based on communication schemes specified by a cryptography system 100. The terminals 102 are generally operable to receive, transmit, process, and store information. Although FIG. 1 shows two terminals 102, a cryptography system 100 may include any number of terminals. The cryptography system 100 can include groups or subgroups of terminals that can communicate with each other, but not necessarily with the terminals in other groups or subgroups. The cryptography system 100 can include terminals of disparate types, having different types of hardware and software configurations, and in a variety of different locations. In some cases, multiple devices or subsystems can be identified together as a single terminal. The terminals in the cryptography system 100 can each utilize an implicit certificate that has been validated by the batch certificate server 106.

The terminals 102 typically include a data processing apparatus, a data storage medium, and a data interface. For example, the terminals 102 can include a memory, a data processor, and an input/output controller. A terminal can include user interface devices, for example, a monitor, touchscreen, mouse, or keyboard. The memory of the terminal can store messages and information associated with the cryptography system. For example, a terminal may store the public and private key data, digital certificate data, and other types of information. The memory of the terminal can store instructions (e.g., computer code) associated with computer applications, programs and computer program modules, and other resources.

The terminals 102 can be implemented as handheld devices such as smart phones, personal digital assistants (PDAs), portable media players, laptops, notebooks, tablets, and others. Terminals can include work stations, mainframes, non-portable computing systems, devices installed in structures, vehicles, and other types of installations. Terminals can include embedded communication devices. For example, the terminals can include messaging devices that are embedded in smart energy meters of a smart energy system. Other types of terminals may also be used.

A terminal can be associated with a particular user entity, a particular user identity, or any combination thereof. One or more of the terminals can be associated with a human user. In some implementations, the terminals are not associated with any particular human user. One or more of the terminals can be associated with a particular device, a particular location, a particular installation, or other identifying information.

In some aspects of operation, the batch certificate server 106 sends the certificate request message 120 to the certificate authority server 104, and the certificate authority server 104 generates the batch 121 of implicit certificates. Each of the implicit certificates in the batch 121 associates a particular public key value with a particular user entity (e.g., a particular terminal, a particular user associated with a terminal, a particular module implemented at a terminal, etc.). The batch certificate server 106 validates the batch 121 of implicit certificates. For example, the batch certificate server 106 may evaluate a batch-validation function and an element-order-validation function for the batch 121. After the batch 121 of implicit certificates is validated, the batch certificate server 106 can provide the implicit certificates and associated cryptographic data to terminals for use in communication. For example, the terminal 102a receives the implicit certificate 122a and an associated private key value from the batch certificate server 106, and the terminal 102b receives the implicit certificate 122b and an associated private key value from the batch certificate server 106.

An implicit certificate scheme implemented by the cryptography system 100 allows the terminals 102 to communicate with each other in a secure manner, even when the communications are observable by malicious users. The implicit certificate 122a binds a user entity associated with the terminal 102a to a particular public key value that can be used to verify digital signatures generated by the terminal 102a. The terminal 102b can obtain the implicit certificate 122a to verify that the digital signature was generated by the user entity associated with the terminal 102a, and not by an impostor. The terminal 102b can also verify that the implicit certificate 122a was generated by a trusted third party at the certificate authority server 104. In this manner, the implicit certificate 122a serves as confirmation by the trusted third party that the signed message 124a was signed by the user entity associated with the terminal 102a and not by an impostor.

Each of the implicit certificates includes an identification of a user entity. For example, the implicit certificate 122a may include an identification of the terminal 102a or a user associated with the terminal 102a. An implicit certificate includes information that can be used to construct the user entity's public key. In some cases, using an implicit certificate to verify a digital signature also confirms that the user entity is in possession of the corresponding private key. In some implementations, an implicit certificate is more compact than some other types of digital certificates. For example, the implicit certificates 122a, 122b shown in FIG. 1 include neither an explicit representation of the public key nor an explicit representation of the certificate authority's digital signature. In some cases, an implicit certificate includes a digital signature of the certificate authority that allows user entities, for example a user entity associated with the terminal 102b, to verify that the implicit certificate 122a was generated by the trusted certificate authority. In some cases, an implicit certificate includes an explicit representation of the public key.

Instead of explicitly representing the public key values that are certified by the implicit certificates, the example implicit certificates 122a, 122b in FIG. 1 include public key reconstruction data that can be combined with other information (e.g., the certificate authority's public key, etc.) to generate the public key values. The example implicit certificates 122a, 122b are constructed such that successful verification of a digital signatures generated using implicit certificates 122a, 122b serves as confirmation that the signer is in possession of the private key. Thus, according to some implicit certificate schemes, binding of a user entity to its public key and the user entity's knowledge of its private key can be verified in unison during key usage. Implicit certificate schemes can be implemented based on different types of groups. For example, the ECQV implicit certificate scheme and the OMC implicit certificate schemes, as well as others, may be implemented using a group of points on an elliptic curve, a multiplicative group of a finite field, or other groups where the discrete logarithm problem may be hard.

In some aspects of operation, when the terminal 102a has a message to send to the terminal 102b, the terminal 102a generates a digital signature for the message based on the private key associated with the implicit certificate 122a. The digital signature is combined with the message to form the signed message 124a, which the terminal 102a sends to the terminal 102b. The signed message 124a and the implicit certificate 122a can be sent together or separately. In some implementations, the signed message 124a is sent by the terminal 102a, and the terminal 102b obtains the implicit certificate 122a from another source. The terminal 102b receives the signed message 124a and the implicit certificate 122a, and verifies the digital signature based on the implicit certificate 122a. Implicit certificates can also be used in other types of schemes, for example, encryption schemes.

Figure 2:
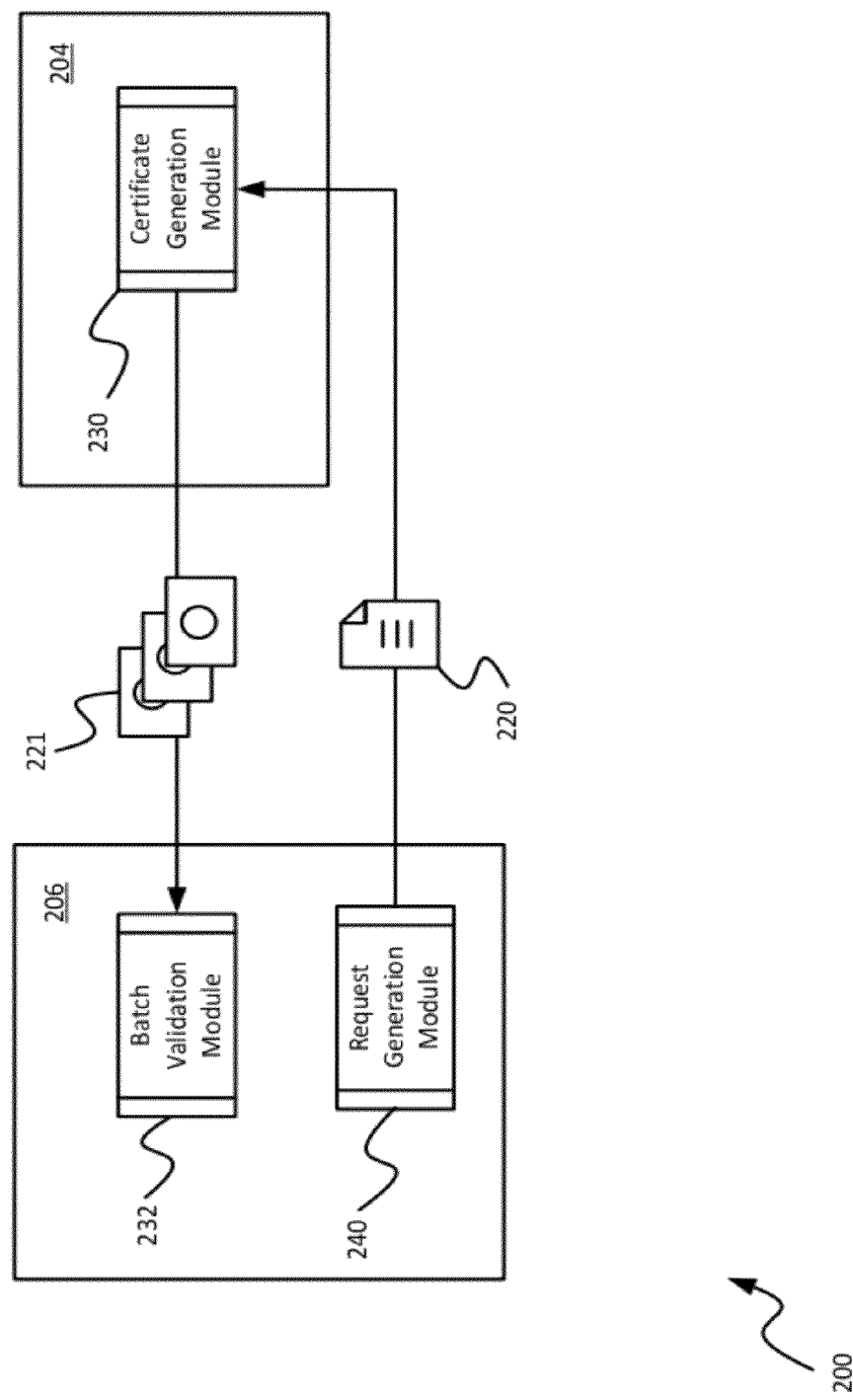
FIG. 2 is a schematic diagram showing aspects of another example cryptography system.

FIG. 2 is a schematic diagram showing aspects of an example cryptography system 200 that implements an implicit certificate scheme. The cryptography system 200 includes a certificate authority module 204 and a batch certificate module 206. The cryptography system 200 can include additional or different components. For example, the cryptography system 200 may include user modules and other types of modules. The batch certificate module 206 and the certificate authority module 204 can include computer programs, hardware, or any combination thereof. For example, the certificate authority module 204 can be implemented by the certificate authority server 104 of FIG. 1 and the batch certificate module 206 can be implemented by the batch certificate server 106 of FIG. 1. In some implementations, the batch certificate module 206 and the certificate authority module 204 can be implemented by other types of sub-systems or devices. For example, in a peer-to-peer computing environment, server functionality can be distributed among client devices.

The batch certificate module 206 and the certificate authority module 204 can communicate with each other, for example, over a data network or another type of communication link. In the example shown in FIG. 2, the batch certificate module 206 can send one or more certificate requests 220 to the certificate authority module 204. The certificate authority module 204 can receive the certificate request 220 from the batch certificate module 206 and send a batch 221 of implicit certificates and other data (e.g., private key contribution data, cryptography system parameters, etc.) to the batch certificate module 206 in response to the certificate request 220. The cryptography system 200 can support additional or different types of communications. For example, in some cases the batch 221 is generated by multiple certificate requests generated by the batch certificate module 206, by one or more user modules, or by any combination of these and other modules.

The batch certificate module 206 includes a request generation module 240 and a batch validation module 232. The batch certificate module 206 may include additional features. The request generation module 240 can generate the one or more certificate requests 220 that are sent to the certificate authority module 204. The certificate request 220 can include one or more group elements $R_i$ each for a different user entity. The request generation module 240 may receive multiple certificate requests from user terminals, and the request generation module 206 may combine the received requests in a single certificate request. In some cases, the request generation module 240 derives group elements $R_i$ for multiple certificate requests, for example, by obtaining random numbers and combining the random numbers with a generator of the group.

The certificate authority module 204 includes a certificate generation module 230. The certificate authority module 204 can include additional or different features. The certificate generation module 230 receives the one or more certificate requests 220 from the batch certificate module 232. The certificate requests 220 may be received in a single message or in multiple messages; they may be received in groups, from one or more sources, or in any other suitable manner. The certificate generation module 232 generates the batch 221 of implicit certificates. The implicit certificates in the batch 221 may be generated in different locations, at different times. Multiple implicit certificates may be generated in sequence or in parallel. The number of implicit certificates in the batch 221 may depend on the number of certificate requests received, computing resources available, or other considerations. The batch 221 is sent to the batch certificate module 232. The implicit certificates in the batch 221 may be sent together, separately, in sub-groups, etc.

The batch validation module 232 receives data for the batch 221 of implicit certificates and validates the batch 221 based on the data. In some implementations, the batch validation module 232 validates the batch 221 by executing all or part of the example techniques shown in FIGS. 3, 4, and 5. For example, the batch validation module 232 may receive key-pair-validation data for the implicit certificates in the batch 221 and collectively validate the key pairs for the batch 221 based on the techniques represented in Equations 4, 5, and 6 or another type of batch-validation technique. As another example, the batch validation module 232 may receive group elements for the implicit certificates in the batch and collectively validate the order of the group elements for the batch 221 based on the element-order-validation technique represented in Equations 12 and 13 or another type of element-order-validation technique. The batch validation module 232 may perform different or additional types of validation for the batch 221 of implicit certificates, for individual implicit certificates, or combinations thereof. For example, in some cases, the batch validation module 232 may validate one or more implicit certificates based on a key-pair-validation function applied to key-pair-validation data for individual implicit certificates.

The batch validation module 232 may accept or reject the batch 221, or the batch validation module 232 may accept or reject individual implicit certificates in the batch 221 based on the batch validation. For example, the batch validation module 232 can identify whether the batch 221 includes an invalid key pair. If the batch validation module 232 identifies that the batch 221 does include an invalid key pair, the batch validation module 232 can identify which implicit certificate in the batch 221 is invalid and reject the invalid implicit certificate(s), the batch validation module 232 can accept valid implicit certificates in the batch 221, the batch validation module 232 can reject the entire batch, or the batch validation module 232 can take any combination of these and other steps.

If the batch validation module 232 identifies that the batch 221 does not include an invalid key pair, the batch validation module 232 can accept the batch 221. In some implementations, when a batch is accepted, the batch is approved for use in the cryptography system 200. For example, the implicit certificates in the batch 221 may be distributed to user terminals for use. In some implementations, when a batch is accepted, additional validation checks are performed on the batch. For example, the implicit certificates in the batch 221 may be validated based on multiple different criteria.

Figure 3:
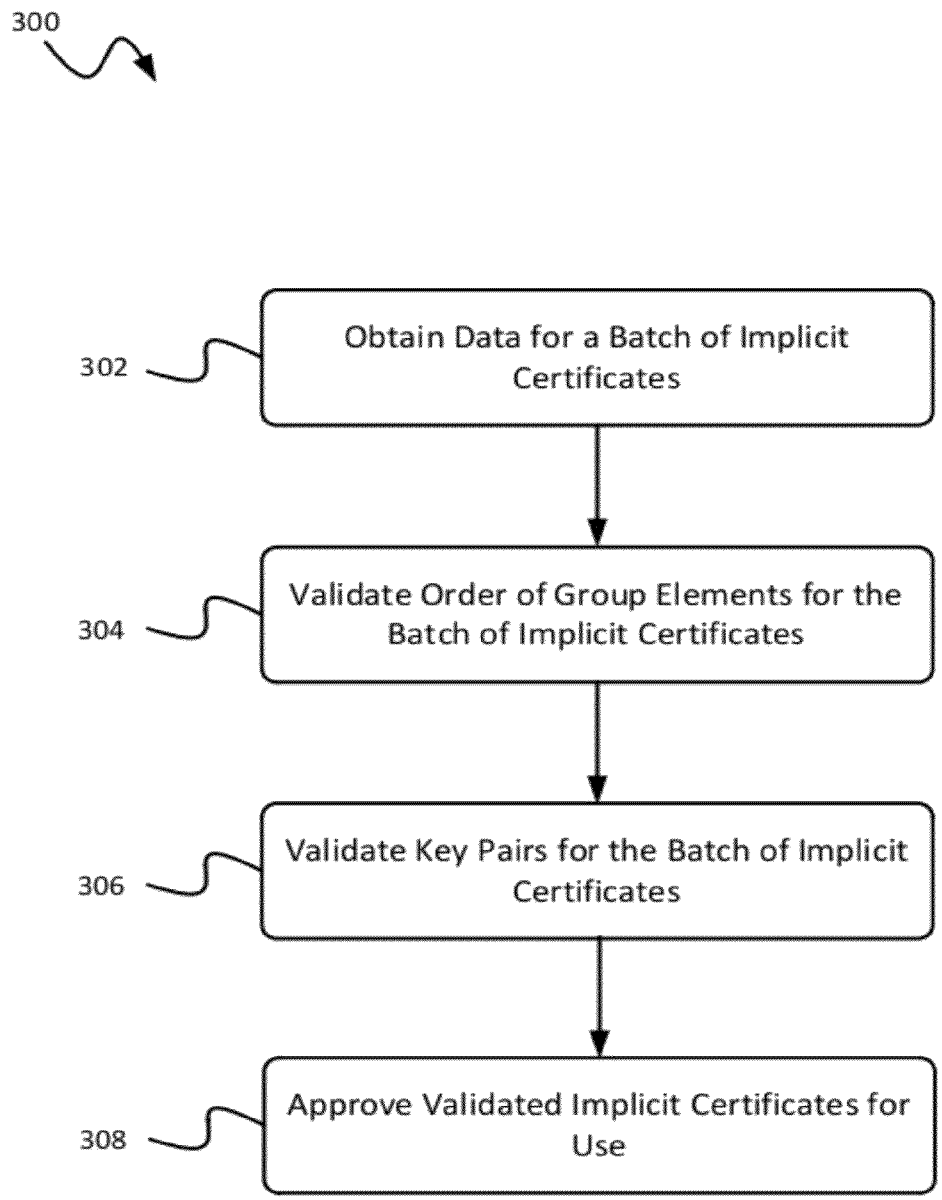
FIG. 3 is a flow chart showing aspects of an example technique for validating a batch of implicit certificates.

FIG. 3 is a flow chart showing an example process 300 for validating a batch of implicit certificates. In some implementations, one or more of the operations in the example process 300 can be performed based on techniques described with respect to the process 400 shown in FIG. 4, techniques described with respect to the process 500 shown in FIG. 5, or any combination of these and other validation techniques. The example processes 300, 400, and 500 shown in FIGS. 3, 4, and 5 can be performed by a batch certificate server, multiple batch certificate servers, or by other types of computing systems. For example, all or part of the process 300 can be executed by the batch certificate server 106 of FIG. 1 or the batch certificate module 206 of FIG. 2. In some cases, operations can be performed by a certificate authority module, a user module, or another type of module in a cryptography system.

The example processes 300, 400, and 500 can be executed for a batch of implicit certificates, sub-batches or sub-groups within a batch of implicit certificates, or for individual implicit certificates in a batch. The example processes 300, 400 and 500 can include additional or different operations, and the operations may be executed in the order shown or in a different order. For example, the process 300 may include additional or different types of validation operations that are not shown in FIG. 3. In some implementations, one or more operations in the processes 300, 400, and 500 can be repeated or executed in an iterative fashion.

At 302, a batch of implicit certificates is obtained. The batch of implicit certificates may include any number of implicit certificates. For example, the batch may include a single implicit certificate or tens or hundreds of implicit certificates. The data for the batch can include the implicit certificates themselves, data related to or derived from the implicit certificates, or a combination. For example, the data for the batch may include key-pair-validation data that can be used to construct and validate the key pairs for the implicit certificates in the batch. In some implementations, the key-pair-validation data can include explicit representations of the public key values, the private key values, the public key reconstruction values, the private key reconstruction values, the implicit certificates, hashes of the implicit certificates, or any combination of these and other data.

Figure 5:
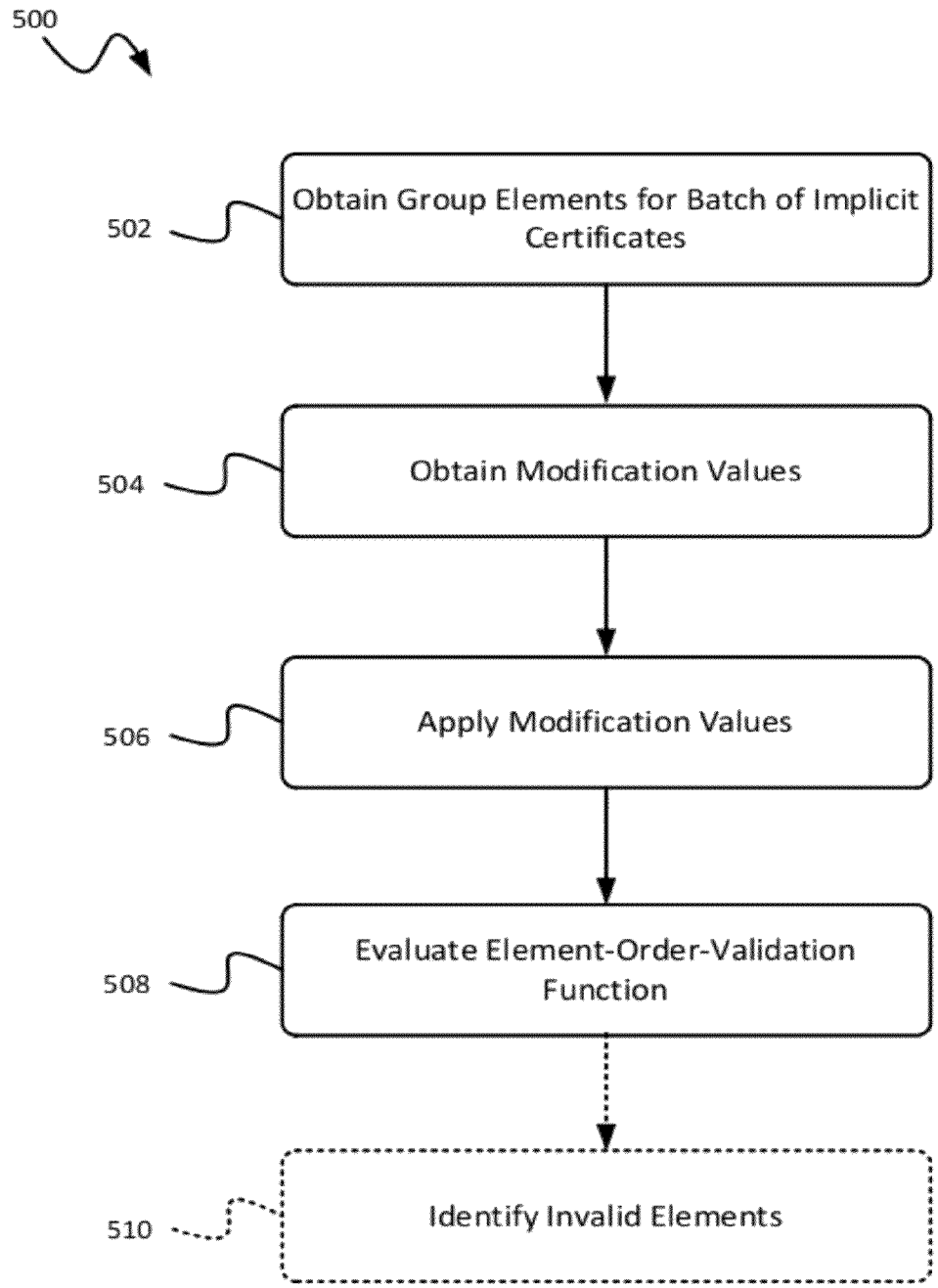
FIG. 5 is a flow chart showing aspects of an example technique for validating the order of elements for a batch of implicit certificates.

At 304, the order of group elements is validated for the batch. For example, various components of the data for each implicit certificate can be implemented as elements of a group. In the ECQV implicit certificate scheme, the group elements are points on an elliptic curve. Other types of group elements can be used. In some implementations, valid group elements have a particular order. The particular order of valid group elements can be specified by cryptographic parameters for the cryptographic scheme being implemented. The order of the group elements included in the data for the batch of implicit certificates can be validated collectively. An example technique for collectively validating the order of the group elements is shown in FIG. 5. In some examples, the element-order-validation function represented by Equations 12 and 13 or a similar function can be used.

Figure 4:
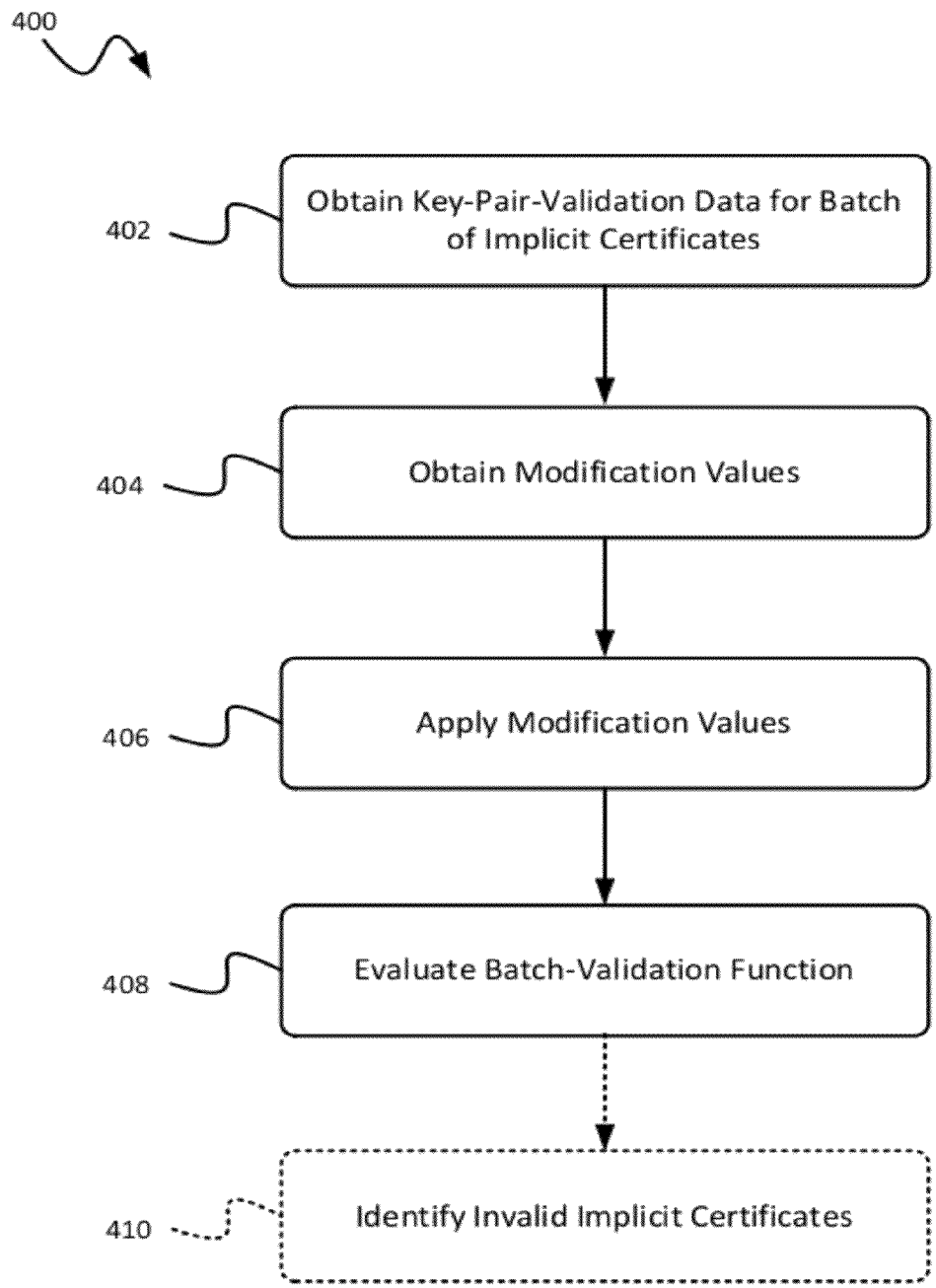
FIG. 4 is a flow chart showing aspects of an example technique for validating key pairs for a batch of implicit certificates.

At 306, the key pairs are validated for the batch. A key pairs is either valid or invalid based on a relationship between the private key and the public key in the key pair. For example, the cryptographic scheme can define a relationship between the private and public keys of a valid key pair. Validating the key pairs for the batch can check to ensure that all of the implicit certificates in the batch have valid key pairs. Key pairs for a batch of implicit certificates can be validated without explicitly computing the key pairs. For example, the key pair data for a batch can be validated without computing the public key for any individual implicit certificate in the batch. An example technique for validating the order of the group elements is shown in FIG. 4. In some examples, the batch-validation functions represented by Equations 4, 5, and 6 or similar functions can be used.

At 308, the implicit certificates that have been accepted by the validation operations (e.g., at 304 and 306) are approved for use in the cryptography system. In some instances, the whole batch of implicit certificates is accepted and approved for use. In some instances, the whole batch is denied approval. For example, when the batch of implicit certificates is rejected by one or more of the validation operations, approval may be denied for one or more of the implicit certificates, or possibly all of the implicit certificates in the batch. In some implementations, the implicit certificates that caused the batch to be rejected are identified and removed from the batch. After the implicit certificates that caused the batch to be rejected have been removed from the batch, the remaining implicit certificates can be validated as a new batch. Approved implicit certificates can be distributed to user entities. For example, approved implicit certificates can be injected into terminals, such as the terminals 102 shown in FIG. 1 or other types of terminals.

FIG. 4 is a flow chart showing an example technique for validating key pairs for a batch of implicit certificates. Validating key pairs may provides assurance that the key pair satisfies arithmetic requirements of the cryptography system, for example, to prevent malicious insertion of an invalid public key to enable attacks, or to detect inadvertent coding or transmission errors. Key pair validation may be implemented by multiple different entities in a cryptography system, at different times and for different purposes.

At 402, key-pair-validation data for a batch of implicit certificates are obtained. The batch of implicit certificates can include l implicit certificates and the key-pair-validation data include l data sets $\mathcal{D}_i$. Each of the data sets $\mathcal{D}_i$ includes the key-pair-validation values for one of the implicit certificates in the batch. The key-pair-validation values for each implicit certificate can include, for example, a private key value $b_i$, a public key reconstruction value $P_i$, a certificate authority public key value $C_i$, and a hash value $e_i$. Additionally or alternatively, in some implementations, key-pair-validation values for each implicit certificate include a public key value $B_i$, a private key reconstruction value $s_i$, an implicit certificate $\text{Cert}_U^i$, a group generator g, attribute data $U_i$, a certificate request value $R_i$, or any combination of these and other values relating to the validity of a cryptographic key pair.

At 404, modification values are obtained. The modification values can include modification values that are independently selected for each of the implicit certificates in the batch. The modification values can be uncorrelated or substantially uncorrelated with each other, and they can be uncorrelated or substantially uncorrelated with the key-pair-validation data. For example, the modification values can be selected randomly or by another type of process. The modification values include a modification value $d_i$ for each data set $\mathcal{D}_i$. The modification values include multiple modification values for each data set $\mathcal{D}_i$. In some instances, one or more of the modification values $d_i$ is a pre-selected value. For example, the pre-selected value can be the identity value for a particular operation (e.g., the identity value 1 for multiplication or exponentiation operations, or the identity value 0 for addition operations).

At 406, the modification values are applied. For example, one or more of the key-pair-validation values in each data set $\mathcal{D}_i$ can be modified by mathematically combining the modification values with the key-pair-validation values. The modification values can be applied so as to preserve the validity or the invalidity of each data set $\mathcal{D}_i$, according to a key-pair-validation function. For example, the modification value $d_i$ in each data set $\mathcal{D}_i$ can be applied to the private key value $b_i$ in each data set $\mathcal{D}_i$ by a multiplication operation, an addition operation, an exponentiation operation, or another type of mathematical operation. In such an example, the same modification value $d_i$ in each data set $\mathcal{D}_i$ can be applied to the public key derivation values (e.g., the public key reconstruction value $P_i$, the certificate authority public key $C_i$, the hash value $e_i$, etc.) in each data set $\mathcal{D}_i$ by a corresponding mathematical operation that preserves the validity or the invalidity of each data set $\mathcal{D}_i$. The corresponding mathematical operation that preserves validity or invalidity of each data set $\mathcal{D}_i$ can be determined based on the appropriate key-pair-validation function (e.g., Equation 1 or Equation 2, etc.). In some instances, applying a modification value to a key-pair-validation value modifies the key-pair-validation value. In some instances, applying a modification value to a key-pair-validation value does not modify the key-pair-validation value (e.g., when $d_i$ is the identity element for the operation).

At 408, a batch-validation function is evaluated. In the example process 400, at least one of the key-pair-validation values for each implicit certificate is modified by applying the modification values (at 406), and the batch-validation function is evaluated based on the modified key-pair-validation values for the batch of implicit certificates. Evaluating the batch-validation function identifies whether any data set $\mathcal{D}_i$ for the batch is invalid according to the key-pair-validation function. In other words, the batch-validation function identifies whether the key pair for any implicit certificate in the batch is invalid, and may do so without evaluating the key-pair-validation function for any individual implicit certificate. In some implementations, evaluating the batch-validation function for the batch of implicit certificates requires fewer computational resources than applying the key-pair-validation function to the key-pair-validation values for each individual implicit certificate.

In some cases, the batch-validation function either accepts or rejects the batch of implicit certificates. Equation 4 shows an example of a batch-validation function that either accepts or rejects the batch based on modified key-pair-validation values. A batch-validation function may have additional or different types of outputs. Evaluating a batch-validation function can include evaluating one or more mathematical expressions. For example, evaluating the batch-validation function in Equation 4 may include evaluating some or all of the mathematical expressions in Equation 5 or Equation 6 to determine whether the relationship represented in Equation 5 or Equation 6 holds. In some cases, the left-hand side and the right-hand side of a mathematical relationship can be evaluated and compared to determine if the relationship holds. Whether the batch-validation function accepts or rejects the batch can be determined based on the result of the comparison. For example, if the relationship in Equation 6 holds for a batch of ECQV implicit certificates, then the batch can be accepted; and if the relationship in Equation 6 does hold for a batch of ECQV implicit certificates, then the batch can be rejected. The batch-validation function can reject the batch of implicit certificates without identifying which data set $\mathcal{D}_i$ is invalid.

At 410, if the batch-validation function rejects the batch, invalid implicit certificates in the batch can be identified. In some instances, the batch-validation function rejects the batch, indicating that at least one of the data sets $\mathcal{D}_i$ for the batch of implicit certificates is invalid, without necessarily identifying which of the data sets is invalid. In such instances, the individual implicit certificate that caused the batch to be rejected can subsequently be identified. In cases where the batch fails validation, additional techniques can be used to identify which key-pair-validation values caused the batch to fail. For example, the invalid key-pair-validation values can be identified by applying the key-pair-validation function (e.g., Equation 1 or Equation 2) to the key-pair-validation values for each implicit certificate individually.

In some implementations, a binary splitting technique can be used to identify the invalid key-pair-validation values. The binary splitting algorithm divides the batch of implicit certificates into two sub-batches. In some cases, the sub-batches are equal or nearly equal in size. According to the binary splitting technique, the batch-validation function is then evaluated for both of the sub-batches. If the batch-validation function accepts one of the sub-batches, that sub-batch can be approved. If the batch-validation function rejects one of the sub-batches, that sub-batch can be further divided into two additional sub-batches, and the additional sub-batches can each be evaluated by the batch-validation function. Other types of splitting algorithms may be used. For example, in some implementations, the batch may be split into more than two sub-batches, and the sub-batches may be unequal in size.

Implicit certificates having a valid key pair (e.g., implicit certificates that are accepted based on applying the batch-validation function) can be approved for use. For example, implicit certificates having a valid key pair can be injected into manufactured devices. Implicit certificates having an invalid key pair can be rejected. The certificate authority can be notified of any rejected implicit certificates. In some implementations, when an implicit certificate with an invalid key pair is detected, a new certificate request is generated and sent to the certificate authority, for example, so that the certificate authority can generate a new implicit certificate.

FIG. 5 is a flow chart showing an example technique for validating group elements for a batch of implicit certificates. Validating the order of group elements may provide assurance that the group elements satisfy arithmetic requirements of the cryptography system, for example, to prevent malicious insertion of an invalid public key to enable attacks, or to detect inadvertent coding or transmission errors. Element order validation may be implemented by multiple different entities in a cryptography system, at different times and for different purposes.

At 502, group elements for a batch of implicit certificates are obtained. The group elements can include one or more group elements for each of the implicit certificates in the batch. In some examples, 1 group elements $\{(Q_i)\}_{i=1}^l$ are obtained. The group elements for each data set can correspond to, for example, a public key reconstruction value P, a certificate authority public key value C, a certificate request value R, a public key value B, or any combination of these and other values relating to an implicit certificate. In some cases, obtaining a group element includes obtaining values needed to compute the group element. For example, a group element corresponding to a public key can be obtained by obtaining the certificate authority public key C, the hash value e, and the public key reconstruction value P, which can be used to compute the public key, for example, according to an equation such as $B=C^eP$, $B=CP^e$, or another equation.

Domain parameters for the batch of implicit certificates can also be obtained. The domain parameters indicate a particular order n for group elements. A group element Q can be an element of a group G, where the order of the group G is n, and G is a subgroup of G', where G' is a larger group with order nh. For example, validating that the group element Q has order n may ensure that the group element Q belongs to G, and not another subgroup of G'. The order of the group element Q can be individually validated by checking that $Q^n=1$ and $Q\neq 1$. If g is a generator of the group G, the order of the group element Q can be individually validated based at least in part on verifying that $n(\log_g Q)(\mod nh)=0$.

At 504, modification values are obtained. The modification values can include modification values that are independently selected for each of the group elements. The modification values can be uncorrelated or substantially uncorrelated with each other, and they can be uncorrelated or substantially uncorrelated with the group elements. For example, the modification values can be selected randomly or by another type of process. The modification values can include a modification value $d_i$ for each group element $Q_i$. The modification values can include multiple modification values for each group element. In some instances, one or more of the modification values $d_i$ is a pre-selected value. For example, the pre-selected value can be the identity value for a particular operation (e.g., the identity value 1 for multiplication and exponentiation operations, or the identity value 0 for addition operations).

At 506, the modification values are applied. For example, group elements can be modified by mathematically combining the modification values with the group elements. In some implementations, the group elements and the modification values can be combined in an element-order-validation function. The modification values can be applied so as to preserve the validity or the invalidity of the order of each group element $Q_i$. For example, the modification values can be applied as an exponent, such that $Q_i^{d_i n}=1$ when $Q_i^n=1$. In some cases, the modification value $d_i$ can be applied to the group element $Q_i$ by a multiplication operation, an addition operation, an exponentiation operation, or another type of mathematical operation.

At 508, an element-order-validation function is evaluated. In the example process 500, one or more group elements for each implicit certificate is modified by applying the modification values (at 506), and the element-order-validation function is evaluated based on the modified group elements. The element-order-validation function can be evaluated to identify whether the group elements include any group element $Q_i$ having an order that is different from the particular order n specified by the cryptographic parameters for the cryptography scheme being implemented. In other words, the element-order-validation function can, in some cases, identify whether the order of any group element is invalid without necessarily calculating the order of any individual group element. In some implementations, evaluating the element-order-validation function collectively for the group elements requires fewer computational resources than computing the order of each element individually.

In some cases, the element-order-validation function either accepts or rejects the group elements. Equation 12 shows an example of an element-order-validation function that either accepts or rejects the group elements based on the group elements as modified by the modification values. An element-order-validation function may have additional or different types of outputs. Evaluating an element-order-validation function can include evaluating one or more mathematical expressions. For example, evaluating the element-order-validation function in Equation 12 may include evaluating some or all of the mathematical expressions in Equation 13 to determine whether the relationship represented in Equation 13 holds. In some cases, the left-hand side and the right-hand side of a mathematical relationship can be evaluated separately and compared to determine if the relationship holds.

Whether the element-order-validation function accepts or rejects the group elements can be determined based on the result of the comparison. The element-order-validation function may reject the group elements without identifying which group element is invalid.

At 510, if the element-order-validation function rejects the group elements, individual group elements can be identified. In some instances, the element-order-validation function rejects the group elements, without necessarily identifying which of the group elements has an invalid order. In such instances, one or more individual group elements having an order that is different from the particular order n may be identified. In cases where the group elements collectively fail validation, additional techniques can be used to identify which group elements caused the failure. For example, the group element(s) having an invalid order can be identified by computing the order of each group element individually. In some implementations, a binary splitting technique can be used to identify group element(s) having an invalid order. Other types of splitting algorithms may be used.

Implicit certificates having valid group elements (e.g., group elements that are accepted based on applying the element-order-validation function) can be approved for use. For example, implicit certificates having valid group elements can be injected into manufactured devices. Implicit certificates having invalid group elements can be rejected. The certificate authority can be notified of any rejected implicit certificates. In some implementations, when an implicit certificate with invalid group elements is detected, a new certificate request is generated and sent to the certificate authority, for example, so that the certificate authority can generate a new implicit certificate.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In some aspects, key-pair-validation data for a batch of implicit certificates are received. The key-pair-validation data include key-pair-validation values for each of the implicit certificates. The key-pair-validation values for each implicit certificate are either valid or invalid according to a key-pair-validation function. A batch-validation function is evaluated for the batch of implicit certificates based on the key-pair-validation values. Evaluating the batch-validation function identifies whether the key-pair-validation data include key-pair-validation values that are invalid according to the key-pair-validation function.

Implementations of these and other aspects may include one or more of the following features. At least one of the key-pair-validation values for each implicit certificate is modified. Modifying at least one of the key-pair-validation values for each implicit certificate includes obtaining modification values independent of the key-pair-validation values. The modification values include a modification value for each of the implicit certificates. Modifying at least one of the key-pair-validation values for each implicit certificate includes combining the modification values and the key-pair-validation values in the batch-validation function. Obtaining modification values includes randomly selecting each of the modification values. Evaluating the batch-validation function indicates that the key-pair-validation data for the batch of implicit certificates includes key-pair-validation values that are invalid. An individual implicit certificate in the batch is identified, and the key-pair-validation values for the individual implicit certificate are invalid. The individual implicit certificate is identified based on a binary splitting algorithm. Evaluating the batch-validation function indicates that the key-pair-validation data does not include key-pair-validation values that are invalid, and the batch of implicit certificates is approved. Evaluating the batch-validation function for the batch of implicit certificates requires fewer computational resources than applying the key-pair-validation function to the key-pair-validation values for each individual implicit certificate.

Additionally or alternatively, implementations of these and other aspects may include one or more of the following features. The batch of implicit certificates includes l implicit certificates and the key-pair-validation data include l data sets. Each of the data sets $\mathcal{D}_i$ includes the key-pair-validation values for one of the implicit certificates. The key-pair-validation values for each implicit certificate include a private key value $b_i$, a public key reconstruction value $P_i$, a certificate authority public key value $C_i$, and a hash value $e_i$. Modifying at least one of the key-pair-validation values for each implicit certificate includes obtaining modification values. The modification values include a modification value $d_i$ for each data set $\mathcal{D}_i$. Modifying at least one of the key-pair-validation values for each implicit certificate includes applying the modification value $d_i$ to the private key value $b_i$. The implicit certificates are based on an OMC scheme, and applying the modification value $d_i$ to the private key value $b_i$ includes a multiplication operation $d_i b_i$. Evaluating the batch-validation function includes evaluating one or more of the expressions in Equation 5 above. The implicit certificates are based on an ECQV scheme, and applying the modification value $d_i$ to the private key value $b_i$ includes a multiplication operation $b_i d_i$. Evaluating the batch-validation function includes evaluating one or more of the expressions the Equation 6 above.

In some aspects, key-pair data for an implicit certificate are accessed. The key-pair data include a private key value and public key reconstruction value that corresponds to a public key value. A relationship between the public key value and the private key value is either valid or invalid. A modification value is applied to the key-pair data. Applying the modification value modifies the private key value, the public key reconstruction value, or both. A batch-validation function is evaluated based on the modified key-pair data to identify whether the relationship between the public key value and the private key value is invalid.

Implementations of these and other aspects can include one or more of the following features. The implicit certificate is a first implicit certificate. A batch of implicit certificates includes the first implicit certificate and multiple additional implicit certificates. Key-pair data for each of the additional implicit certificates are accessed. The key-pair data for the additional implicit certificates includes a private key value for each additional implicit certificate and a public key reconstruction value that corresponds to a public key value for each additional implicit certificate. Additional modification values are applied to the key-pair data for the additional implicit certificates. Applying the additional modification values modifies at least one of the private key value or the public key reconstruction value for each of the additional implicit certificates. Evaluating the batch-validation function includes evaluating the batch-validation function based on the modified key-pair data for the batch of implicit certificates to identify whether the relationship between the public key value and the private key value for at least one of the implicit certificates of the batch is invalid.

In some aspects, multiple group elements are accessed. The group elements correspond to public key values for a batch of implicit certificates. Domain parameters for the batch of implicit certificates are accessed. The domain parameters indicate a particular order for group elements. Multiple modification values are obtained. The modification values include a modification value for each of the group elements. The group elements and the modification values are combined in an element-order-validation function. The element-order-validation function is evaluated to identify whether the group elements include a group element having an order that is different from the particular order.

Implementations of these and other aspects can include one or more of the following features. Obtaining the modification values includes randomly selecting the modification values. Evaluating the element-order-validation function indicates that the group elements include a group element having an order that is different from the particular order. An individual group element having an order that is different from the particular order is identified. There are l group elements and l modification values. Evaluating the element-order-validation function includes evaluating one or more of the expressions in Equation 13 above.

The validation techniques disclosed herein, including the key-pair-validation techniques and the element-order-validation techniques described above, may be implemented for various types of groups and group parameters. For example, the validation techniques may be carried out for an elliptic curve group or another type of group. The groups may be represented multiplicatively, additively, or in another manner. In the example equations provided above, the group G is written multiplicatively. The examples can be extended other representations of a group, for example, where the group is written additively.

For example, the group-validation function in Equation 4 above can utilize Equation 6 for an ECQV scheme where the elliptic curve group is written multiplicatively. The ECQV scheme can also be implemented based on an elliptic curve group that is written additively. As such, Equation 6 above can be adapted for the additive group as follows:

$$g^{\Sigma_{i=1}^{l} b_i d_i} = \prod_{c_j \in \mathcal{C}} C_j^{\Sigma_{C_j = C_j}^{l} d_i} \prod_{i=1}^{l} P_i^{e_i d_i}. \tag{6}$$

becomes $$(\Sigma_{i=1}^{l} b_i d_i) g = \Sigma_{c_j \in \mathcal{C}} ((\Sigma_{C_j = C_j}^{l} d_i) C_j) + \Sigma \Sigma_{i=1}^{l} (e_i d_i) P_i \tag{14}$$

when the group is written additively. Moreover, when there is only a single certificate authority public key value C (e.g., where there is a single certificate authority), Equation 14 can be simplified to $$(\Sigma_{i=1}^{l} b_i b_i) g = (\Sigma_{i=1}^{l} d_i) C + \Sigma_{i=1}^{l} (e_i d_i) P_i. \tag{15}$$

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for validating a batch of implicit certificates, the method comprising:

accessing key-pair-validation data for a batch of implicit certificates, wherein the key-pair-validation data include key-pair-validation values for each of the implicit certificates in the batch, and the key-pair-validation values for each implicit certificate are either valid or invalid according to a key-pair-validation function, wherein the batch of implicit certificates includes l implicit certificates and the key-pair-validation data include l data sets, each of the data sets $\mathcal{D}_i$ includes the key-pair-validation values for one of the implicit certificates, and the key-pair-validation values for each implicit certificate include a private key value $b_i$, a public key reconstruction value $P_i$, a certificate authority public key value $C_i$, and a hash value $e_i$;

modifying at least one of the key-pair-validation values for each implicit certificate; and evaluating, by a computing system, a batch-validation function for the batch of implicit certificates based on the key-pair-validation data that include the modified key-pair validation values, wherein evaluating the batch-validation function identifies whether the key-pair-validation data for the batch of implicit certificates include key-pair-validation values that are invalid.

2. The method of claim 1, wherein evaluating the batch-validation function indicates that the key-pair-validation data for the batch of implicit certificates include key-pair-validation values that are invalid.

3. The method of claim 2, further comprising identifying an individual implicit certificate in the batch for which of the key-pair-validation values are invalid.

4. The method of claim 3, wherein the individual implicit certificate is identified based on a binary splitting algorithm.

5. The method of claim 1, wherein evaluating the batch-validation function indicates that the key-pair-validation data do not include key-pair-validation values that are invalid, and the method further comprises approving the batch of implicit certificates.

6. The method of claim 1, wherein evaluating the batch-validation function for the batch of implicit certificates requires fewer computational resources than evaluating the key-pair-validation function for each individual implicit certificate.

7. The method of claim 1, wherein modifying at least one of the key-pair-validation values for each implicit certificate includes:

obtaining modification values independent of the key-pair-validation values, wherein the modification values include a modification value for each of the implicit certificates; and combining the modification values and the key-pair-validation values in the batch-validation function.

8. The method of claim 7, wherein obtaining the modification values includes randomly selecting each of the modification values.

9. The method of claim 1, wherein modifying at least one of the key-pair-validation values for each implicit certificate includes:

obtaining modification values including a modification value $d_i$ for each data set $\mathcal{D}_i$; and applying the modification value $d_i$ to the private key value $b_i$.

10. The method of claim 9, wherein the implicit certificates are based on an OMC scheme, applying the modification value $d_i$ to the private key value $b_i$ includes a multiplication operation $d_i b_i$.

11. The method of claim 10, wherein evaluating the batch-validation function includes evaluating one or more expressions of an equation:

$$g^{\sum_{i=1}^{l} d_i b_i} = \prod c_{j \in \mathcal{C}} C_j^{\sum_{C_i = C_j}^{l} e_i d_i} \prod_{i=1}^{l} P_i^{d_i},$$

wherein g is a generator of a group, and $\mathcal{C} = \cup_{i=i}^{l}\{C_i\}$ is a set of distinct certificate authority public key values.

12. The method of claim 9, wherein the implicit certificates are based on an ECQV scheme, applying the modification value $d_i$ to the private key value $b_i$ includes a multiplication operation $b_i d_i$.

13. The method of claim 12, wherein evaluating the batch-validation function includes evaluating one or more expressions of an equation:

$$g^{\sum_{i=1}^{l} b_i d_i} = \prod c_{j \in \mathcal{C}} C_j^{\sum_{C_i = C_j}^{l} d_i} \prod_{i=1}^{l} P_i^{e_i d_i},$$

wherein g is a generator of a group, and $\mathcal{C} = \cup_{i=i}^{l}\{C_i\}$ is a set of distinct certificate authority public key values.

14. A non-transitory computer-readable medium storing instructions that are operable when executed by data processing apparatus to perform operations for validating an implicit certificate, the operations comprising:
  accessing key-pair data for an implicit certificate, wherein the key-pair data include a private key value and public key reconstruction value that corresponds to a public key value, and a relationship between the public key value and the private key value is either valid or invalid;
  applying a modification value to the key-pair data, wherein applying the modification value modifies at least one of the private key value or the public key reconstruction value; and
  evaluating a batch-validation function based on the modified key-pair data to identify whether the relationship between the public key value and the private key value is invalid,
  wherein the batch-validation function is evaluated based on the modified key-pair data and additional data for a batch of implicit certificates, and the additional data include, for each respective implicit certificate in the batch, a private key value, a public key reconstruction value, a certificate authority public key value, and a hash value.

15. The computer-readable medium of claim 14, wherein the implicit certificate includes a first implicit certificate, and the batch of implicit certificates includes the first implicit certificate and a plurality of additional implicit certificates, the operations further comprising:
  accessing key-pair data for each of the additional implicit certificates;
  applying additional modification values to the key-pair data for the additional implicit certificates, wherein applying the additional modification values modifies at least one of the private key value or the public key reconstruction value for each of the additional implicit certificates; and
  wherein evaluating the batch-validation function includes evaluating the batch-validation function based on the modified key-pair data for the batch of implicit certificates to identify whether the batch includes an implicit certificate for which the relationship between the public key value and the private key value is invalid.

16. The computer-readable medium of claim 15, wherein evaluating the batch-validation function identifies that the relationship between the public key value and the private key value for at least one of the implicit certificates is invalid.

17. The computer-readable medium of claim 16, the operations further comprising identifying an individual implicit certificate in the batch for which the relationship between the public key value and the private key value is invalid.

18. The computer-readable medium of claim 17, wherein the individual implicit certificate is identified based on a binary splitting algorithm.

19. A computing system comprising:
  a certificate authority server system adapted to generate a plurality of implicit certificates;
  a batch certificate server system adapted to perform operations including:
    accessing key-pair-validation data for the plurality of implicit certificates, wherein the key-pair-validation data include key-pair-validation values for each of the implicit certificates, the key-pair-validation values for each implicit certificate include a private key value, a public key reconstruction value, a certificate authority public key value, and a hash value, and the key-pair-validation values for each implicit certificate are either valid or invalid according to a key-pair-validation function;
    modifying at least one of the key-pair-validation values for each implicit certificate; and
    evaluating a batch-validation function for the plurality of implicit certificates based on the modified key-pair-validation values, wherein evaluating the batch-validation function identifies whether the key-pair-validation data include key-pair-validation values that are invalid.

20. The computing system of claim 19, further comprising a plurality of computing devices adapted to execute secure communications based on the plurality of implicit certificates.

21. The computing system of claim 19, wherein modifying at least one of the key-pair-validation values for each implicit certificate includes:
  obtaining modification values independent of the key-pair-validation values, wherein the modification values include a modification value for each of the implicit certificates; and
  combining the modification values and the key-pair-validation values in the batch-validation function.

22. The computing system of claim 21, further comprising a random number selector module that randomly selects the modification values.

23. The computing system of claim 19, wherein evaluating the batch-validation function identifies that the key-pair-validation data for the plurality of implicit certificates include key-pair-validation values that are invalid.

24. The computing system of claim 23, the operations further including identifying an individual implicit certificate for which of the key-pair-validation values are invalid.

25. The computing system of claim 24, wherein the individual implicit certificate is identified based on a binary splitting algorithm.

26. The computing system of claim 19, wherein evaluating the batch-validation function indicates that the key-pair-validation data do not include key-pair-validation values that are invalid, and the operations further include approving the plurality of implicit certificates.

27. A computer-implemented method for validating public key values for a batch of implicit certificates, the method comprising:
- accessing a plurality of group elements that correspond to public key values for a batch of implicit certificates;
- accessing domain parameters for the batch of implicit certificates, wherein the domain parameters indicate a particular order for group elements;
- obtaining a plurality of modification values including a modification value for each of the plurality of group elements;
- combining the plurality of group elements and the plurality of modification values in an element-order-validation function; and
- evaluating, by a computing system, the element-order-validation function to identify whether the plurality of group elements include a group element having an order that is different from the particular order.

28. The method of claim 27, wherein obtaining a plurality of modification values includes randomly selecting the plurality of modification values.

29. The method of claim 27, wherein evaluating the element-order-validation function indicates that the plurality of group elements includes a group element having an order that is different from the particular order.

30. The method of claim 29, further comprising identifying an individual group element having an order that is different from the particular order.

31. The method of claim 27, wherein the plurality of group elements includes l group elements $Q_i$, the plurality of modification values includes l modification values $d_i$, and evaluating the element-order-validation function includes evaluating the expression:

$$n\Sigma_{i=1}^{l}(d_i \log_g Q_i) \pmod{nh}$$

where n is the particular order indicated by the domain parameters, $d_i$ is the modification value for the $i^{th}$ group element $Q_i$, g is a generator of the group G having a group order n, and h is an integer value.

32. The method of claim 31, wherein the group G is a subgroup of another group G', and the other group G' has a group order nh.

* * * * *